March 1, 1949. J. T. KING 2,462,975
HYDRAULICALLY DRIVEN FISHING REEL
Filed June 12, 1945 2 Sheets-Sheet 1
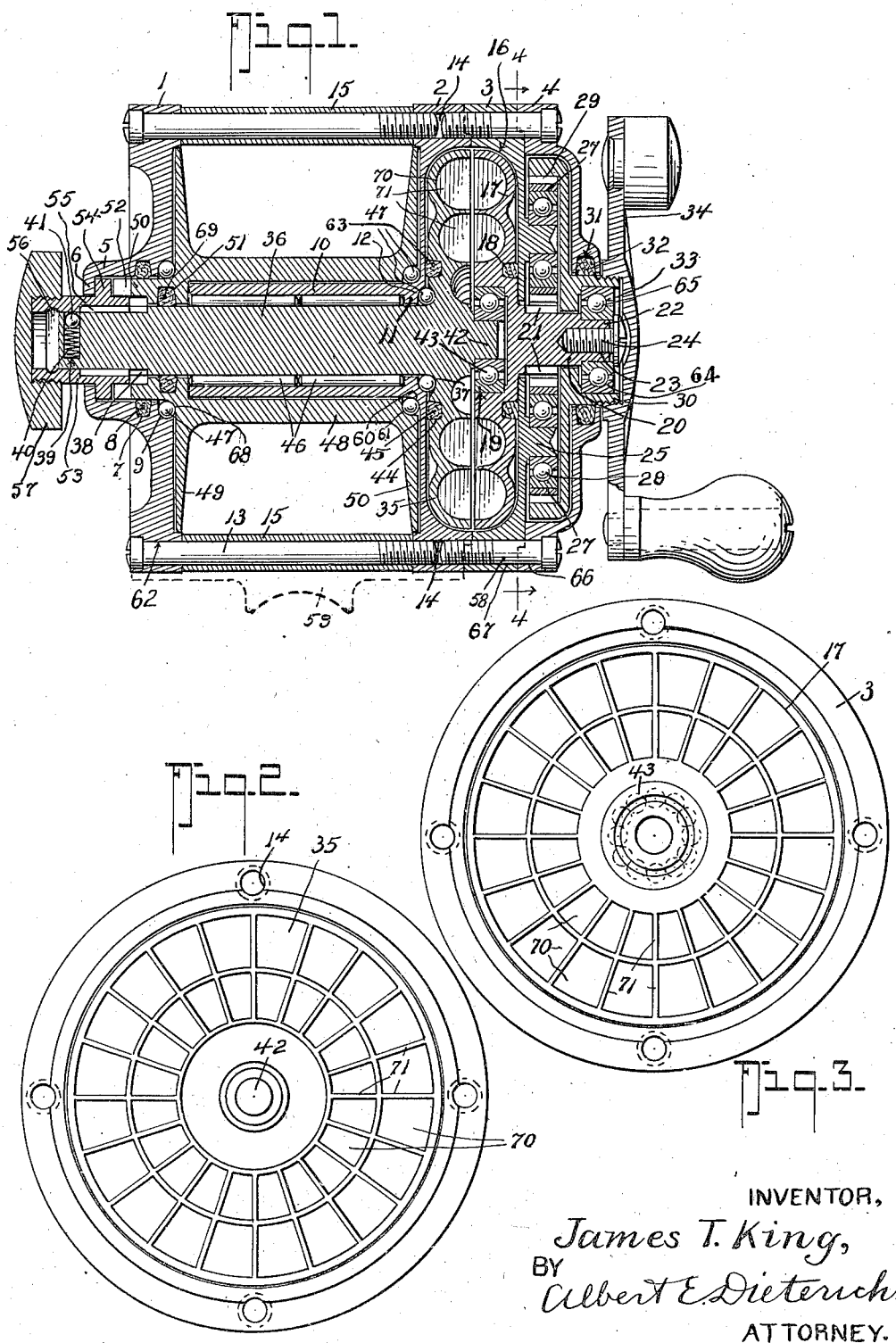
INVENTOR,
James T. King,
BY Albert E. Dieterich,
ATTORNEY.

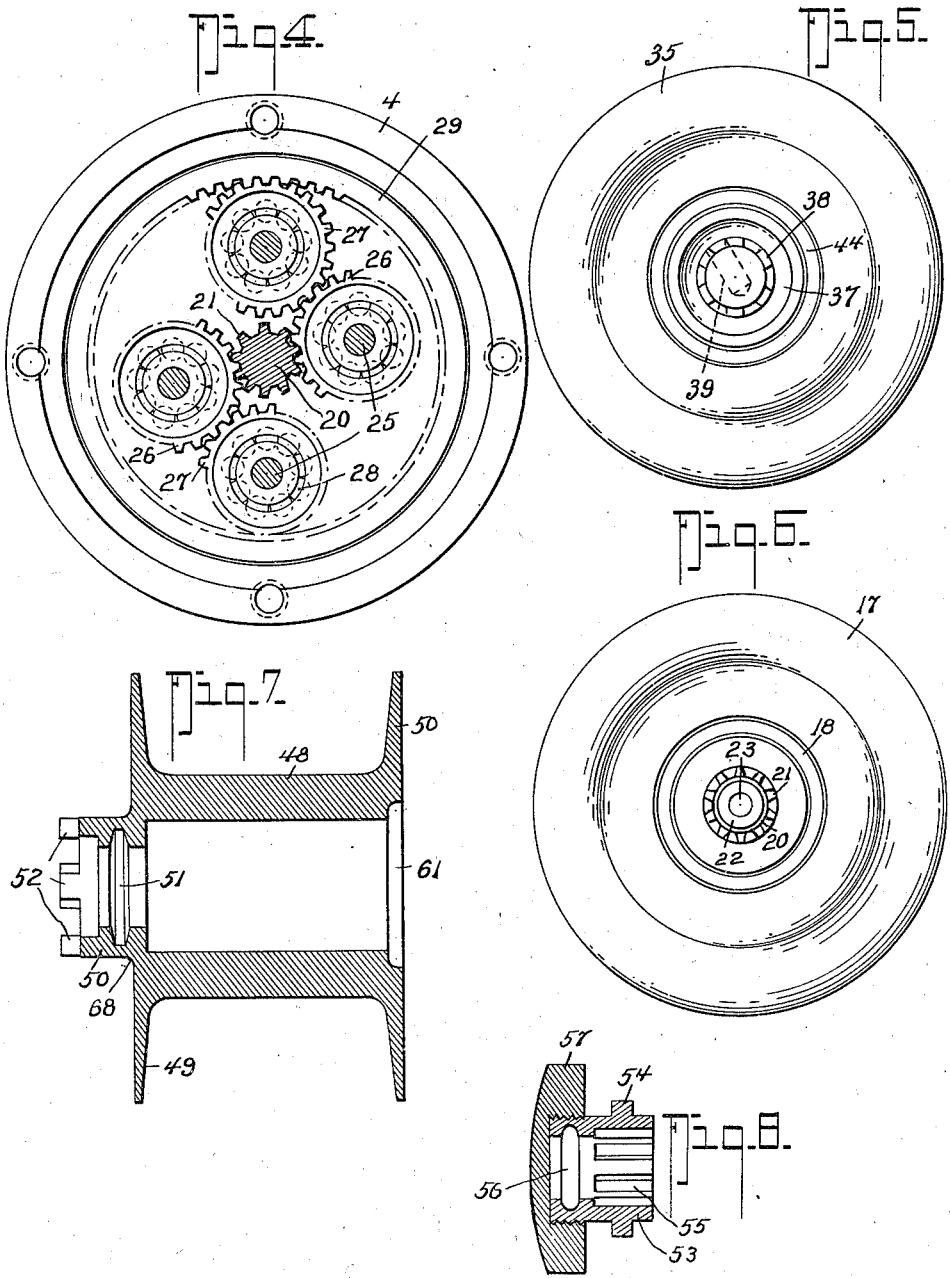

Patented Mar. 1, 1949

2,462,975

UNITED STATES PATENT OFFICE 2,462,975

HYDRAULICALLY DRIVEN FISHING REEL

James T. King, Burbank, Calif.

Application June 12, 1945, Serial No. 599,035

6 Claims. (Cl. 242—84.7)

My invention which relates to hydraulically driven fishing reels has for its specific object to improve the reel disclosed in and constituting the subject matter of my Patent No. 2,388,979, issued November 13, 1945.

More particularly the present invention has for its objects:

1. To improve the construction to make it more economical to manufacture;
2. To provide for a more convenient arrangement of parts for ease in assembling and disassembling the same;
3. To provide for a more effective oil seal to prevent loss of fluid from the impeller chamber;
4. To provide a more effective power transmitting gearing between the crank and the driving impeller;
5. To provide a gear box or chamber separate from but located adjacent the impeller chamber;
6. To improve the clutch connection between the driven impeller shaft and the reel spool; and
7. To improve the construction of the driving and driven impellers.

Other objects will in part be obvious and in part be pointed out hereinafter.

To the attainment of the aforesaid objects and ends, the invention further resides in the novel details of construction, combination and arrangement of parts which shall first be fully described hereinafter and then be specifically pointed out in the appended claims, reference being had to the accompanying drawings in which:

Fig. 1 is a central vertical longitudinal sectional view of my improved reel, parts being shown in elevation.

Fig. 2 is a side elevation of the same looking from right to left in Fig. 1, after removal of the case sections 3 and 4 and their contents.

Fig. 3 is a side elevation of the case sections 3 and 4 with their contents intact, looking from left to right in Fig. 1.

Fig. 4 is a cross section on the line 4—4 of Fig. 1.

Fig. 5 is an end elevation of the driven impeller looking from left to right in Fig. 1.

Fig. 6 is an end elevation of the driving impeller looking from right to left in Fig. 1.

Fig. 7 is a central vertical longitudinal section of the spool.

Fig. 8 is a central vertical longitudinal section of the shiftable clutch.

In the drawings in which like numerals of reference indicate like parts in all the figures, 1 represents the outer left side plate of the reel, 2 the left side plate of the impeller housing, 3 the right side plate of the same and 4 the outer right side plate of the reel which plate also comprises the cover containing the gear chamber.

The plate 1 has a hub 5 having a flange 6 to restrain the clutch member against being pulled off. The hub 5 also has an internal annular inwardly tapered groove 7 to receive a packing 8. The plate 1 is further provided with a ball raceway 9 to receive bearing balls 47.

The plate 2 has an elongated hub 10 extending toward plate 1 but terminating short of the same. The hub 10 at its end adjacent the plate 2 has an annular internal flange 11. A ball race-way 12 is also provided to receive bearing balls 47. The plate 2 has threaded holes 14 for the screw bolts 13 which pass through the holes 62 in plate 1 and through spacers (one of which may be a part of a saddle 59 if desired) and are threaded into the holes 14.

An impeller chamber 16 is formed between plates 2 and 3. The driving and driven impellers and the hydraulic fluid are contained in this chamber.

The driving impeller 17 has an annular, inwardly tapered groove 18 in its outer face, to receive a packing 63. Its inner face is provided with a ball-bearing containing recess 19 in which is fitted the ball bearing unit 43. From the outer face of the driving impeller a stub shaft 20 projects. The stub shaft 20 has a set of gear teeth 21 and has a reduced end 22 provided to receive a race-way 64 of another ball bearing unit 65. The reduced end is bored and tapped as at 23 to receive the bearing-retaining screw 24.

The plate 3 has a set of stub shafts or lugs projecting from its outer face to receive gears 26 and 27 and their ball bearing units 28. An internal driving gear 29 meshes with the gears 27 only while one gear 27 meshes with one gear 26. Both gears 26 mesh with the gear teeth 21 as best shown in Figs. 1 and 4. The internal driving gear has a hub 30 onto which is screwed a crank unit 34. The hub 30 has a recess 33 for the ball bearing unit 65.

The gear case cover plate 4 has an inwardly tapered annular groove 31 to receive the packing 32. It also has holes 66 through which screw bolts 58 pass. The bolts 58 also pass through holes 67 in the plate 3 and are threaded into the tapped holes 14. The bolts 13 and 58 serve to hold the plates 1, 2, 3, and 4 and spacers 15 rigidly assembled.

The driven impeller 35 has a shaft 36 that passes through the elongated hub 10 and is provided with a ball race-way 37 that cooperates with the race-way 12 and the bearing balls 47 therein. The shaft 36 also projects through the hub 5 and has splines 38 to fit the spline grooves 55 of a shiftable clutch sleeve 53. The shaft 36 is further provided with a ball latch socket 39 for a latch ball 41 and spring 30 (see Fig. 1). The driven impeller 35 also has a stub shaft 42 to receive the bearing unit 43. An annular inwardly tapered groove 44 is located in the outer face of the impeller 35, to contain a packing 45. Bearing rollers 46 are located between the shaft 36 and hub 10.

A spool 48 has its side flanges 49 and 50 recessed into the plates 1 and 2 and is bored to freely fit over the hub 10. The spool is provided with ball race-ways 61 and 68 to receive bearing balls 47. The race-way 61 cooperates with the race-way 60 while the race-way 68 cooperates with the race-way 9. The spool 48 has a hub 50 that is bored to receive the sleeve 53 and has clutch teeth or lugs 52 to cooperate with mating teeth or lugs 54 on the clutch sleeve 53. The hub 50 also has an internal inwardly tapered groove 51 for the packing 69.

The shiftable clutch member is best shown in Fig. 8 by reference to which it will be seen that the sleeve 53 has an internal annular latch groove 56 to receive the latching ball 41. It also has a handle 57 threaded on it as shown.

The impellers 17 and 35 have their opposed faces provided with annular grooves 70 with radial webs 71 to afford an effective grip on the hydraulic fluid in the impeller case or housing.

As will be seen by reference to Fig. 1, the parts can be easily and quickly assembled or disassembled.

The several ball bearings serve as end-thrust as well as radial bearings. The packings in the tapered grooves located at the places described provide effective oil seals. Upon turning the crank 34 power will be transmitted via the gears 29, 26, 27, to the driving impeller shaft to turn it in the same direction as that of the crank. By making the driving gear the internal ring gear a greater speed can be given to the driving impeller than is possible with the gear arrangement of my other application above referred to.

From the foregoing description taken in connection with the accompanying drawings it is thought the complete construction, operation and advantages of my invention will be clear to those skilled in the art to which it appertains.

What I claim is:

1. In a fishing reel wherein a spool is driven through the medium of a gear train and a hydraulic clutch, the improvement which includes: a pair of spaced-apart side-plate members rigidly connected together, one of said side-plate members having a tubular hub provided with an internal end flange, a ball raceway and a packing groove; the second side-plate member having one-half of an impeller chamber and having an elongated tubular hub extending toward the first side-plate member, but short of the same; a driven impeller in said half-chamber and having an elongated shaft projected through both said hubs; ball radial and end-thrust bearings between said impeller and said side-plate member hub; a third plate member having the other half of the impeller chamber, secured to said second side-plate member; a driving impeller in said second half of said impeller chamber, said driving impeller having a shaft extending through an opening in the wall of said third plate and having a ball-bearing unit receiving recess; a ball-bearing unit in said recess, said driven impeller having a stub shaft fitted into said ball-bearing unit; a fourth plate enclosing a gear chamber and being secured to said third side-plate; an internal ring gear in said gear chamber and having a hub passing through an opening in the wall of said fourth plate; a crank secured to the projecting end of said last-named hub; stub shafts on the outer side of the wall of said third side-plate, a gear train including gears on said last-named stub shafts, operatively connecting said ring gear with said driving impeller; and a shiftable clutch connection between said driven impeller shaft and the spool.

2. In a fishing reel: a support including two plates spaced apart and rigidly connected together; a spool rotatably mounted between said plates; a third plate secured to the second of said two plates; said second and third plates between them enclosing an impeller chamber; a fourth plate secured to the third plate and enclosing a gear chamber, said third plate having lugs, said lugs projecting into said gear chamber; at least one pair of meshing gears rotatably mounted on said lugs; a driving impeller in said impeller chamber and having a shaft passing through an opening in the wall of said third plate and having gear teeth meshing with one of said pair of meshing gears; a ring gear in said gear chamber rotatably mounted on said impeller shaft and meshing with the other of said pair of meshing gears, said ring gear having a hub; a crank mounted on said hub; a driven impeller in said impeller chamber and having a stub shaft, said driving impeller having a recess into which said stub shaft projects; a ball-bearing unit in said recess and on said stub shaft, by virtue of which the driving impeller is mounted on the driven impeller; the second of said two plates having an elongated tubular hub that projects toward the first of said two plates; the first of said two plates having an outwardly projecting tubular hub; a spool freely rotatably mounted between said two plates on said elongated tubular hub and the first of said two plates and having a hub projecting into the hub of said first plate, said driven impeller having an elongated shaft extending through said elongated tubular hub and into the hub of said first plate and provided at its free end with clutch splines; antifriction bearings between said elongated shaft and said elongated hub; a clutch sleeve slidably mounted in the hub of the first of said two plates and having clutching lugs, said projecting hub of said spool having clutching lugs to cooperate with those of said clutch sleeve, said clutch sleeve having spline grooves to fit on said splines so that said clutch sleeve will be slidable along but rotatable with the elongated shaft of said driven impeller; a latch device carried by the elongated shaft of said driven impeller and cooperatively engaging said clutch sleeve to hold it in operative connection to the spool hub; and a handle on said clutch sleeve.

3. The reel of claim 2, wherein the outside faces of the impellers are provided with annular packing grooves provided with packing engaging the adjacent walls of the second and third of said plates for purposes described.

4. The reel of claim 2, wherein the spool adjacent the first of said plates is provided with an annular packing groove containing a packing engaging the elongated shaft of said driven impeller near its free end for purposes described.

5. The reel of claim 1 wherein the opposite faces of the impellers are provided with concentric grooves intersected by radial webs.

6. The reel of claim 2 wherein the opposite faces of the impellers are provided with concentric grooves intersected by radial webs.

JAMES T. KING.

REFERENCES CITED

The following references are of record in the file of this patent:

UNITED STATES PATENTS

| Number | Name | Date |
| --- | --- | --- |
| 838,765 | Bissel | Dec. 18, 1906 |
| 1,145,038 | Schramm | Juy 6, 1915 |
| 2,176,105 | Schneider | Oct. 17, 1939 |
| 2,255,703 | Grieten | Sept. 9, 1941 |
| 2,388,979 | King | Nov. 13, 1945 |
| 2,389,515 | King | Nov. 20, 1945 |